United States Patent
Clayton et al.

(10) Patent No.: US 9,477,328 B2
(45) Date of Patent: Oct. 25, 2016

(54) FULLY CLICKABLE TRACKPAD

(71) Applicant: GOOGLE INC., Mountain View, CA (US)

(72) Inventors: Joseph Edward Clayton, San Francisco, CA (US); Felix Jose Alvarez Rivera, San Jose, CA (US); Amy Han, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/752,098

(22) Filed: Jun. 26, 2015

(65) Prior Publication Data

US 2015/0293617 A1    Oct. 15, 2015

Related U.S. Application Data

(63) Continuation of application No. 13/424,817, filed on Mar. 20, 2012, now Pat. No. 9,069,394.

(51) Int. Cl.
*G06F 3/0354* (2013.01)
*G06F 3/041* (2006.01)

(52) U.S. Cl.
CPC ........... *G06F 3/03547* (2013.01); *G06F 3/041* (2013.01); *G06F 3/0414* (2013.01); *G06F 2203/04103* (2013.01); *G06F 2203/04105* (2013.01)

(58) Field of Classification Search
CPC .. G06F 3/03547; G06F 3/041; G06F 3/0488; G06F 2203/04105; G06F 3/0202; G06F 3/0213; G06F 2203/04101; H04M 2250/22; H04M 1/23; H01H 2003/0293
USPC ............................ 345/173; 178/18.01, 18.03
See application file for complete search history.

(56) References Cited

U.S. PATENT DOCUMENTS 6,243,080 B1    6/2001    Molne
6,281,887 B1    8/2001    Wang
6,757,002 B1    6/2004    Oross et al.
(Continued)

FOREIGN PATENT DOCUMENTS

CN    1926604 A    3/2007
CN    101930304 A    12/2010
(Continued)

OTHER PUBLICATIONS

Extended European Search Report received for European Patent Application No. 13764653.5, mailed on Sep. 2, 2015, 8 pages.
(Continued)

*Primary Examiner* — Koosha Sharifi-Tafreshi
(74) *Attorney, Agent, or Firm* — Brake Hughes Bellermann LLP

(57) ABSTRACT

According to one general aspect, an apparatus includes a trackpad that includes a cover member having a top surface and a switch coupled to the cover member. At least two spring members are coupled to the trackpad and are each disposed at a non-zero distance from each other and are each configured to collectively bias the trackpad in a first position in which the top surface of the cover member is in a first plane. The trackpad is movable to a second position in which the top surface of the cover member is in a second plane substantially parallel to the first plane when an input force is exerted on the top surface of the cover member. The switch is configured to trigger an electrical signal within a computer when the trackpad is moved to its second position.

20 Claims, 15 Drawing Sheets

(56) References Cited

U.S. PATENT DOCUMENTS

| | | |
|---|---|---|
| 7,499,040 B2 | 3/2009 | Zadesky et al. |
| 8,441,450 B2 | 5/2013 | Degner et al. |
| 2003/0038776 A1 | 2/2003 | Rosenberg et al. |
| 2005/0284743 A1 | 12/2005 | Takiguchi et al. |
| 2006/0119589 A1 | 6/2006 | Rosenberg et al. |
| 2006/0250377 A1* | 11/2006 | Zadesky ............... G06F 1/1613 345/173 |
| 2007/0273671 A1 | 11/2007 | Zadesky et al. |
| 2007/0296702 A1 | 12/2007 | Strawn et al. |
| 2008/0202824 A1 | 8/2008 | Philipp et al. |
| 2008/0266268 A1 | 10/2008 | Wang et al. |
| 2009/0174679 A1* | 7/2009 | Westerman ......... G06F 3/03547 345/173 |
| 2009/0213069 A1* | 8/2009 | Kusaka ................ G06F 1/1616 345/157 |
| 2010/0079404 A1 | 4/2010 | Degner et al. |
| 2010/0177042 A1 | 7/2010 | Chen |
| 2010/0259495 A1 | 10/2010 | Shigetaka et al. |
| 2010/0289751 A1 | 11/2010 | Chen |
| 2010/0300772 A1 | 12/2010 | Lee et al. |
| 2010/0302153 A1 | 12/2010 | Jung et al. |
| 2010/0328234 A1* | 12/2010 | Lu .......................... G06F 3/044 345/173 |
| 2011/0018816 A1* | 1/2011 | Liu ........................ G06F 1/169 345/173 |
| 2011/0222233 A1 | 9/2011 | Lu et al. |
| 2014/0139442 A1 | 5/2014 | Clayton et al. |

FOREIGN PATENT DOCUMENTS

| | | |
|---|---|---|
| CN | 102171632 A | 8/2011 |
| WO | 2013/142468 A1 | 9/2013 |

OTHER PUBLICATIONS

Communication pursuant to Rules 70(2) and 70a(2) EPC received for European Patent Application No. 13764653.5, mailed on Sep. 18, 2015, 2 pages.

International Search Report and Written Opinion for PCT Patent Application No. PCT/US2013/032911, mailed on Aug. 21, 2013, 14 pages.

International Preliminary Report on Patentability for PCT Patent Application No. PCT/US2013/032911, issued on Sep. 23, 2014, 8 pages.

Office Action from application No. CN201380015815.0 with English Translation, mailed Jul. 4, 2016, 20 Pages.

* cited by examiner

FULLY CLICKABLE TRACKPAD

CROSS-REFERENCE TO RELATED APPLICATIONS

This application is a continuation of and claims priority under 35 U.S.C. §120 to U.S. application Ser. No. 13/424,817, filed on Mar. 20, 2012, and entitled "FULLY CLICKABLE TRACKPAD", the contents of which are hereby incorporated by reference.

TECHNICAL FIELD

This description relates to an input device for use with a computing device, such as, a trackpad or a touchpad.

BACKGROUND

Some computing devices, such as, for example, laptop computers, include one or more input devices, such as, for example, a mouse, a keyboard, or a touchscreen. Some computing devices include a trackpad or touchpad that can be used in place of or in addition to a mouse to maneuver a curser on a computer screen, or to trigger one or more functions of a computing device. Such trackpads or touchpads can be coupled to, or integrated within, the computing device There are a variety of different types of trackpads and touchpads that offer a variety of different gesture and/or sensor capabilities. Some trackpads and touchpads operate by the user moving or sliding one or more fingers across the surface of the trackpad or touchpad. Some trackpads or touchpads can respond to an action initiated by a stylus or other instrument that contacts the trackpad or touchpad. Some trackpads or touchpads can also include a "click" feature that allows the user to, for example, perform a right click function. In such devices, the trackpad or touchpad will typically have a specific or limited sensor location or area, referred to as a "sweet spot," on the surface of the trackpad or touchpad in which a user must contact to activate such a clicking function.

Thus, it is desirable to have a trackpad or touchpad that can be actuated at any location across the entire surface of the trackpad or touchpad to improve functionality and ease of use of the clicking function.

SUMMARY

According to one general aspect, an apparatus includes a trackpad that includes a cover member having a top surface and a switch coupled to the cover member. At least two spring members are coupled to the trackpad and are each disposed at a non-zero distance from each other and are each configured to collectively bias the trackpad in a first position in which the top surface of the cover member is in a first plane. The trackpad is movable to a second position in which the top surface of the cover member is in a second plane substantially parallel to the first plane when an input force is exerted on the top surface of the cover member. The switch is configured to trigger an electrical signal within a computer when the trackpad is moved to its second position.

According to another general aspect, an apparatus includes a housing and a trackpad coupled to the housing. The trackpad includes a cover member having a top surface configured to receive an input force and a switch coupled to the cover member. The top surface of the cover member has an outer perimeter. At least two support members each have a first end coupled to the housing and are disposed outside the outer perimeter of the top surface of the cover member and a second end contacting the trackpad. The second end of each of the at least two support members collectively configured to support the trackpad in a first position relative to the housing. The trackpad being movable to a second position relative to the housing when an input force is exerted on the top surface of the cover member. The switch configured to be actuated when the trackpad is moved to its second position.

According to another general aspect, an apparatus includes a housing and a trackpad coupled to the housing. The trackpad includes a cover member having a top surface and switch coupled to the cover member. The track pad includes at least two pins slidably coupled to the housing to allow slidable movement of the trackpad relative the housing. At least two support members are coupled to the trackpad. The at least two support members are collectively configured to bias the trackpad in a first position in which the top surface of the cover member is disposed in a first plane. The trackpad being slidably movable in a substantially vertical direction relative to the housing to a second position in which the top surface of the cover member is disposed in a second plane substantially parallel to the first plane when an input force is exerted on the top surface of the trackpad. The switch configured to trigger an electrical signal within a computer when the trackpad is moved to its second position.

The details of one or more implementations are set forth in the accompanying drawings and the description below. Other features will be apparent from the description and drawings, and from the claims.

DETAILED DESCRIPTION

An input device for use with a computing device is described herein that can be used to communicate with and control operations of a computing device. The input devices can be configured to be contacted by a user on a top surface of the input device to trigger an electronic signal within the computing device. For example, a user can slide or move one or more fingers, or a portion of a hand, across the top surface of the input device to move a curser visible on a display of the computing device. The input devices can also include a "click" function to allow the user to for example, click or select items on the display, or to actuate a right click function. The input devices described herein can allow a user to actuate a click function by exerting or applying a force on a top surface of the input device at any location on the top surface. In other words, the input device does not have a specific sensor location that the user must find to actuate a click function. The input device can also travel a consistent vertical distance and provide a consistent tactile response to the user when the user clicks on any portion of the top surface of the input device.

As used herein, a reference to a top view in a figure refers to a view as viewed by a user during use of an input device. For example, a top view can refer to a view of the input device as disposed within a computing device such that the user can contact the top surface of the input device to initiate an action within the computing device. A reference to a bottom view of the input device refers to a view from underneath or below the input device and that is typically not viewable by a user during use of the input device.

Figure 1:
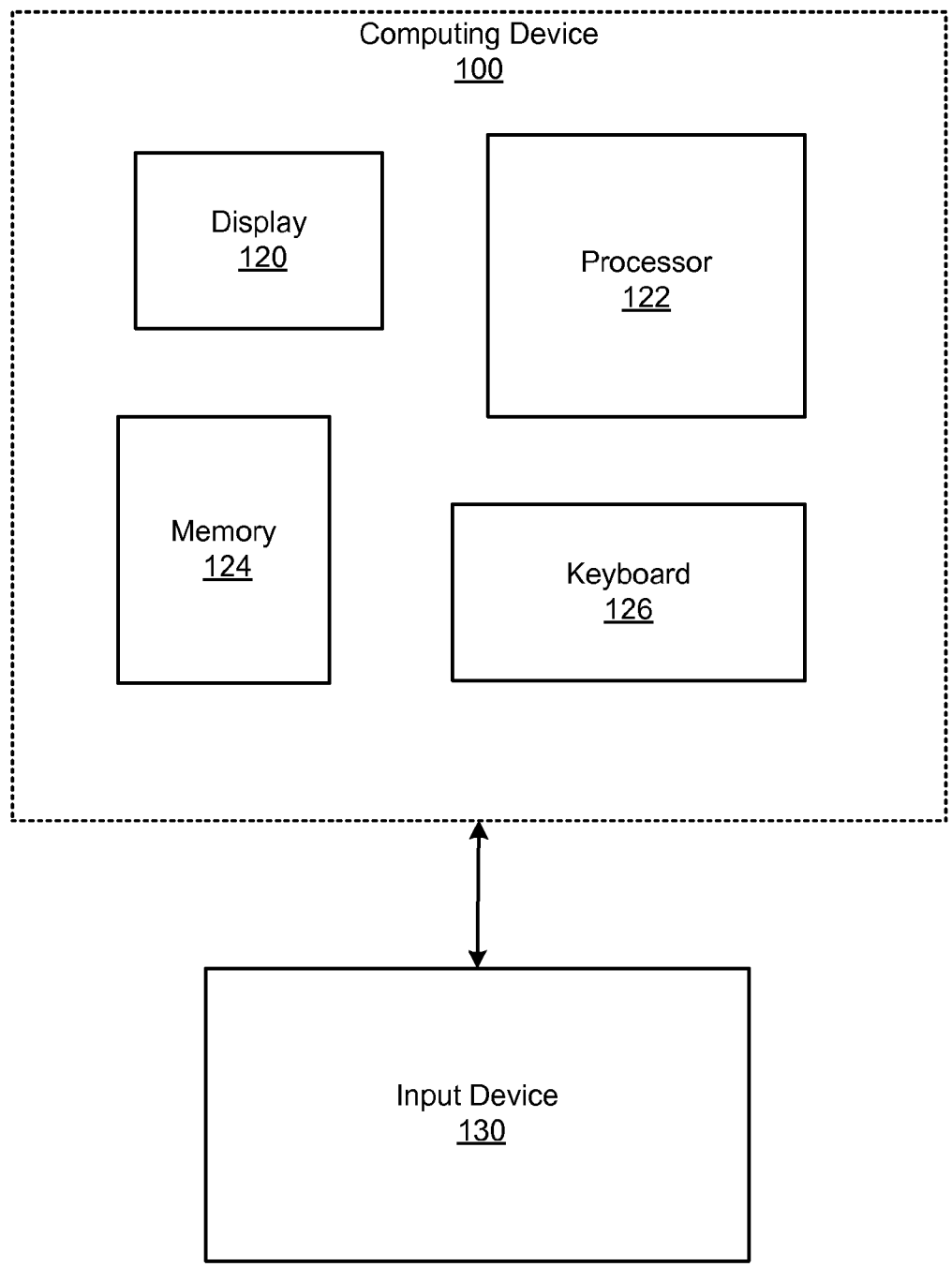
FIG. 1 is a block diagram of a computing device including an input device, according to an implementation.

FIG. 1 is a block diagram of a computing device 100 that can be used in conjunction with an implementation of an input device 130. The input device 130 can be used by a user of the computing device 100 to communicate with, control, and/or actuate one or more functions on the computing device 100. For example, the input device 130 can be used to move a curser on a display screen of the computing device 100. The input device 130 can be for example a trackpad or touchpad as described in more detail below. The input device 130 can be, for example, a touch (e.g., contact) sensitive device, such as, for example, an electrostatic device, a resistive device, a surface acoustic wave (SAW) device, a capacitive device, a pressure sensitive device, a surface capacitive device, a projected capacitive touch (PCT) device, and/or so forth. The input device 130 can be integrated with the computing device 100 or couplable to the computing device 100. The input device 130 can have a wired connection to the computing device 100 or a wireless connection (e.g., wi-fi enabled).

The computing device 100 can include, for example, a display 120, one or more processors 122, one or more memory components 124, and/or a keyboard 126 and/or other touchscreen (not shown). The computing device 100 can be, for example, a wired device and/or a wireless device (e.g., wi-fi enabled device). The computing device 100 can be, for example, a computing entity (e.g., a personal computing device, such as, a laptop computer, a desktop computer, a netbook computer, a tablet, a touchpad, etc.), a server device (e.g., a web server), a mobile phone, a personal digital assistant (PDA), e-reader, and/or so forth. The computing device 100 can be configured to operate based on one or more platforms (e.g., one or more similar or different platforms) that can include one or more types of hardware, software, firmware, operating systems, runtime libraries, and/or so forth.

In some implementations, the computing device 100 can represent a cluster of devices. In such an implementation, the functionality and processing of the computing device 100 (e.g., the one or more processors 122 of the computing device 100) can be distributed to several computing devices of the cluster of computing devices.

In some implementations, one or more portions of the components of computing device 100 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). In some implementations, the functionality of the components can be included in different modules and/or components not shown in FIG. 1. The components of the computing device 100 can be configured to operate within an environment that includes an operating system. In some implementations, the operating system can be configured to facilitate, for example, the interpretation of an interaction with the input device 130.

In some implementations, the computing device 100 can be included in a network. In some implementations, the network can include multiple computing devices (such as computing device 100) and/or multiple server devices (not shown). Also, although not shown in FIG. 1, the computing device 100 can be configured to function within various types of network environments. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can be have portions based on various protocols such as Internet Protocol (IP) and/or a proprietary protocol. The network can include at least a portion of the Internet.

The display 120 of the computing device 100 can be, for example, a liquid crystal display (LCD), a liquid emitting diode (LED) display, or other type of display device. The one or more memory component 124 can be any type of memory device such as a random-access memory (RAM) component or a disk drive memory. As shown in FIG. 1, a memory component 124 can be a local memory included in the computing device 100. Although not shown, in some implementations, the memory component(s) 124 can be implemented as more than one memory component 124 (e.g., more than one RAM component or disk drive memory) within the computing device 100. In some implementations, the memory component(s) 124 can be, or can include, a non-local memory (e.g., a memory not physically included within the computing device 100) within a network (not shown). For example, the memory component(s) 124 can be, or can include, a memory shared by multiple computing devices (not shown) within a network. In some implementations, the memory component(s) 124 can be associated with a server device (not shown) on a client side of a network and configured to serve several computing devices on the client side of the network.

The input device 130 can be configured to be contacted by a user on a top surface of the input device 130 to trigger an electronic signal within the computing device 100. For example, a user can slide or move one or more fingers, or a portion of a hand, across the top surface of the input device 130 to move a curser visible on the display 120. The input device 130 can also include a "click" function to allow the user to click or select items on the display 120 or to actuate a function to be performed by the computing device 100. In one example, the input device 130 can be used to perform a "right click" function to bring up a drop-down menu on the display 120. The input device 130 is configured to allow the user to click on any portion of the top surface of the input device 130. Thus, the user can receive a consistent tactile response when clicking on any portion of the top surface of the input device 130. Such functionality can provide an easier and more efficient computing experience for the user.

Figure 2:
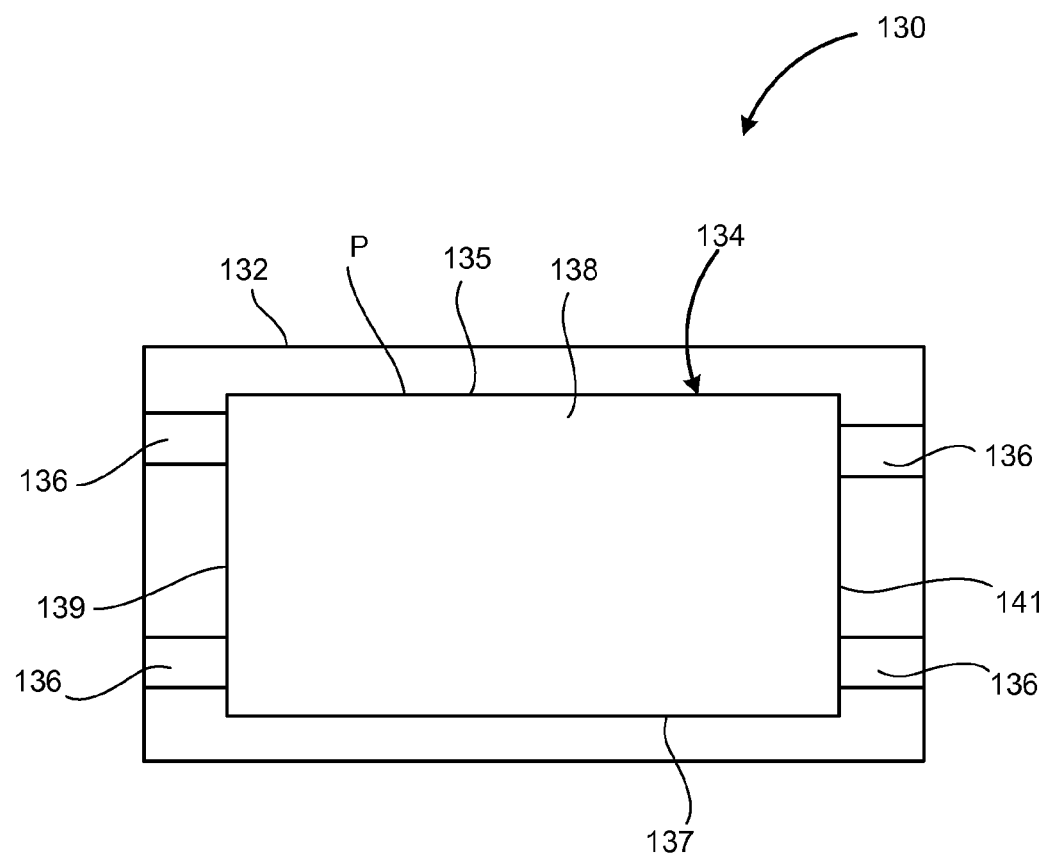
FIG. 2 is a schematic illustration of a top view of an input device, according to an implementation.
Figure 3:
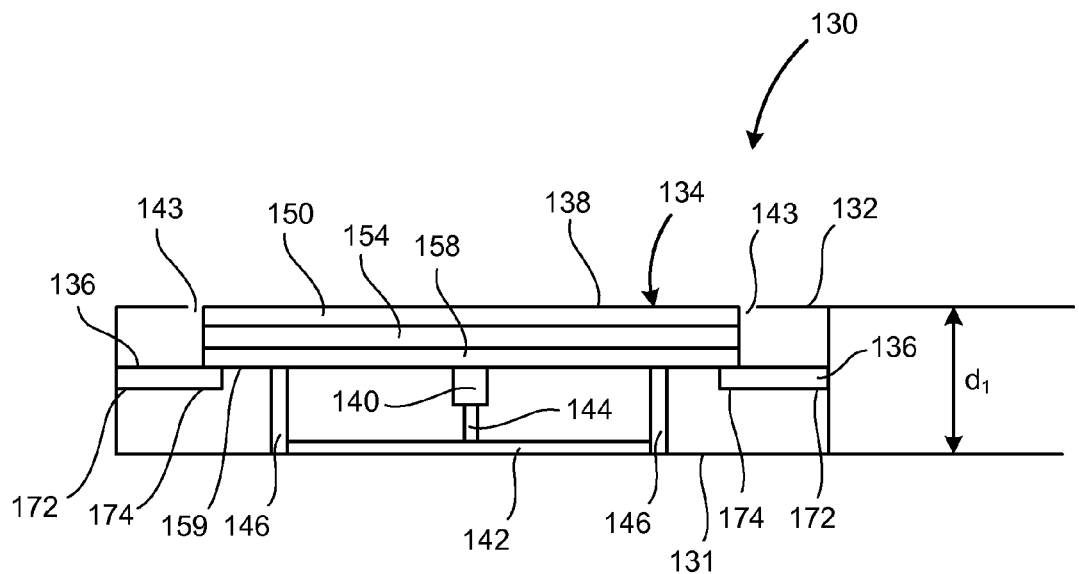
FIG. 3 is a schematic illustration of a side view of the input device of FIG. 2, shown with at trackpad in a first position.
Figure 4:
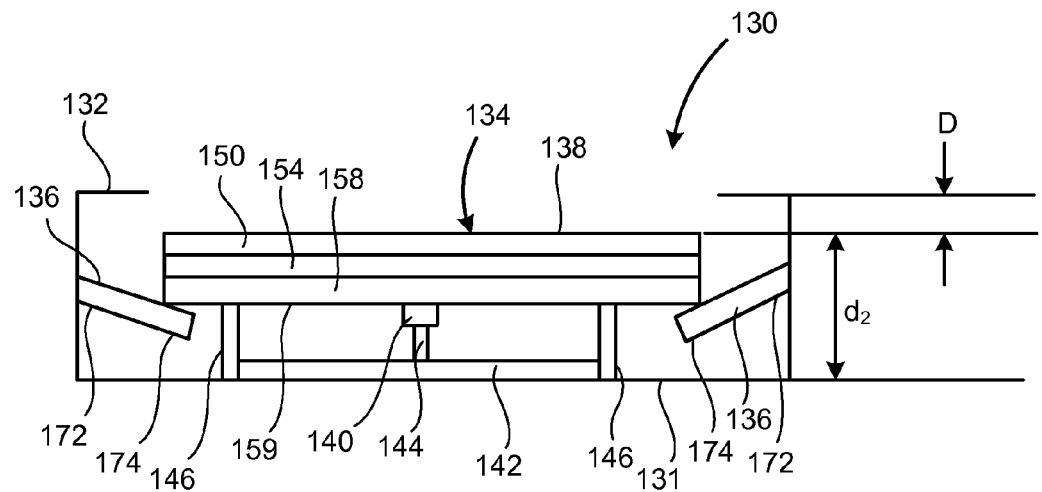
FIG. 4 is a schematic illustration of a side view of the input device of FIG. 2 shown with the trackpad in a second position.

As shown schematically in FIGS. 2-4, the input device 130 can include an enclosure or housing 132, a trackpad assembly 134 (also referred to as "trackpad"), and one or more support members 136. In some implementations, the housing 132 of the input device 130 can be a housing of the computing device 100. In other words, in such an implementation the enclosure or housing of the input device 130 is integral with the housing of the computing device 100. In some implementations, the housing 132 of the input device 130 can be a separate housing component. For example, in some such implementations, the input device 130 can be couplable to the computing device 100. In some implementations, the input device 130 is physically coupled to the computing device 100 and in some implementations the input device 130 is not physically coupled to the computing device 100. For example, the input device 130 may communicate with the computing device 100 with a wireless connection.

The trackpad 134 can include a cover member 150, a sensor 154 and a base member 158. The cover member 154 can include a top surface 138 configured to be contacted by a user to actuate and trigger an electrical response within the computing device 100. For example, the sensor 154 can be activated when a user enters an input (e.g., a touch or a click) on the top surface 138 of the cover member 150. The sensor 154 can be, for example, a flame-retardant class-4 (FR4) printed circuit board. The trackpad 134 can also include a switch 140 that can be used to trigger a response to a click function input by a user. For example, the switch 140 can be electrically coupled to the sensor 154 such that when a user applies or exerts an input force on the top surface 138 of the cover member 150, the switch 140 can be actuated and communicate an electronic signal to the sensor 154. The switch 140 can be, for example, a dome switch. The switch 140 can include electronic components commonly used in such switches such that the switch 140 can electrically communicate with the sensor 154. The switch 140 can be formed at least in part, with, for example, a metallic material, such as a stainless steel (e.g., SUS301) and can include a flexible portion that can be flexed or compressed when an actuated. For example, the switch 140 can be pressed against an actuation member 144 of the input device 130 when the trackpad 134 is actuated as described in more detail below. The actuation member 144 can be, for example a set screw. The actuation member 144 can be threadably coupled to an arm member 142 that is coupled to the housing 132.

The one or more support members 136 can be coupled to the housing 132 and can be configured to bias the trackpad 134 into a first position relative to the housing 132, as shown in FIG. 3. The support members 136 can include a first end portion 172 that is fixedly coupled to the housing 132 with, for example, screws or other suitable fasteners, and a second end portion 174 (see FIGS. 3 and 4) that is disposed below the trackpad 134 and contacts a bottom surface 159 of the trackpad 134. The second end portion 174 can be, for example, cantilevered from the first end portion 172 such that it is "free-floating." As shown in FIG. 2, the cover member 150 has a first side edge 135, a second side edge 137 opposite the first side edge 135, and a third side edge 139 opposite a fourth side edge 141. The side edges 135, 137, 139, 141 define an outer perimeter portion P of the cover member 150. In some implementations, the first end portion 172 of the support members 136 can be coupled to the housing 132 at a location outside of the perimeter portion P (see FIGS. 2-4).

The trackpad 134 can be moved to a second position, as shown in FIG. 4, when a user exerts an input force on the top surface 138 to initiate a clicking function. The support members 136 can have a first configuration in which they are configured to support and maintain (e.g., bias) the trackpad 134 in its first position relative to housing 132. The support members 136 can be configured to bend or flex such that when the trackpad 134 is moved to its second position as mentioned above, the trackpad 134 will exert a force on the second end portion of the support members 136 and move (e.g., bend or flex) the support members 136 to a second configuration. In other words, the second end portion of the support members 136 can bend or flex relative to the first end portion of the support members 136. The support members 136 can be, for example, spring members. For example, the support members 136 can be flat springs. In some implementations, the input device 130 can include, for example, two, three, four or more support members 136. In some embodiments, the support members 136 can be on any side (side, top, and/or bottom) of the trackpad 134, can be at different (e.g., opposite) corners of the trackpad 134, can be on opposite sides of the trackpad 134, can be paired and directly across from one another (as shown in FIG. 2), can be at staggered positions on opposite sides (side, top, and/or bottom) of the trackpad 134, and so forth.

The trackpad 134 can move from its first position to its second position by slidably moving relative to the housing 132 in a substantially vertical direction such that the top surface 138 of the support member 150 is moved from a first plane to a second plane that is substantially parallel to the first plane. In other words, the entire top surface 138 is moved vertically a distance D (see FIG. 4) when the trackpad 134 is moved from its first position to its second position. In some embodiments, the distance D can be between 0.15 to 0.25 millimeters (mm) (e.g., 0.22 mm, 0.2 mm). In some embodiments, the distance D can be greater than 0.25 mm (e.g., 0.3 mm, 0.4 mm) or less than 0.15 mm (e.g., 0.1 mm). In some embodiments, the variation in distance D across the trackpad 134 can be approximately ±20%. In some embodiments, the variation in distance D across the trackpad 134 can be greater than 20% (e.g., 25%, 30%), or less than 20% (e.g., 10%, 5%). Said another way, the top surface 138 is disposed at a distance $d_1$ relative to a bottom wall 131 of the housing 132, as shown in FIG. 3, and is moved to a distance $d_2$ relative to the bottom wall of the housing 132, as shown in FIG. 4. Thus, the outer perimeter portion P of the cover member 150 is moved substantially an equal distance when the trackpad 134 is moved from its first position to its second position.

In some implementations, the trackpad 134 can be slidably coupled to the housing 132 with one or more alignment pins 146 that can be slidably received within a corresponding opening(s) defined in the housing 132. In some implementations, the one or more alignment pins can be slidably received within a corresponding bushing(s) (not shown in FIGS. 1-4) coupled to the housing 132. The bushings can be, for example, Delrin bushings. In some implementations, the touchpad 134 includes two alignment pins. The alignment pins 146 can also be used to help align the trackpad 134 to the housing 132. For example, such alignment can be useful to maintain a desired tolerance of a gap 143 defined between the outer perimeter portion P of the cover member 150 and the housing 132 as shown in FIG. 3.

The slidable coupling of the trackpad 134 to the housing 132 together with the support members 136 allows the trackpad 134 to be actuated with a clicking function when a user exerts an input force on any portion of the top surface 138 of the cover member 150. Thus, the user does not have to search for a specific "sensor location" or "sweet spot" on the trackpad 134 to actuate a clicking function.

FIGS. 5-12 illustrate an implementation of an input device 230. The input device 230 includes a housing 232, a trackpad assembly 234 and support members 236. In this implementation, the housing 232 can be coupled to a computing device (e.g., computing device 100 described above) or can be used as a separate component that communicates with the computing device 100 using a wireless connection. The input device 230 can be, for example, a touch (e.g., contact) sensitive device, such as, for example, an electrostatic device, a resistive device, a surface acoustic wave (SAW) device, a capacitive device, a pressure sensitive device, a surface capacitive device, a projected capacitive touch (PCT) device, and/or so forth.

Figure 6:
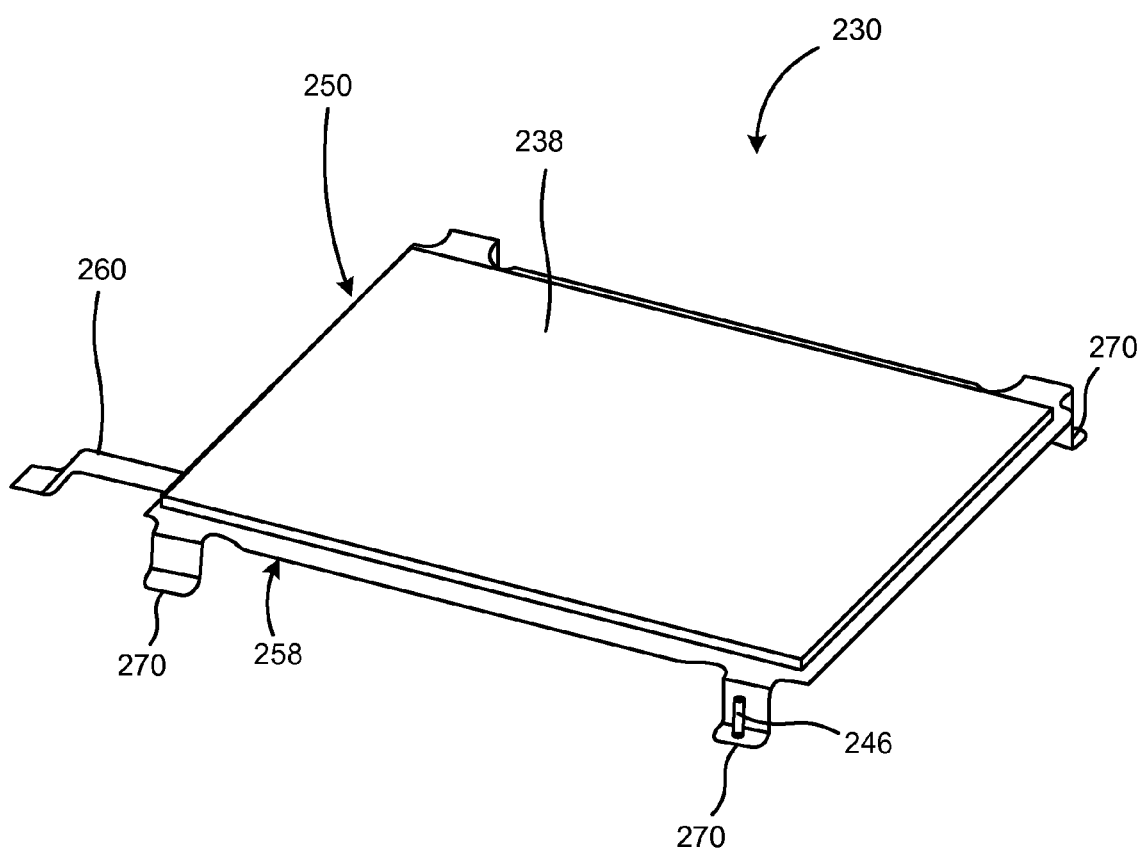
FIG. 6 is a perspective view of a trackpad assembly, according to an implementation.
Figure 7:
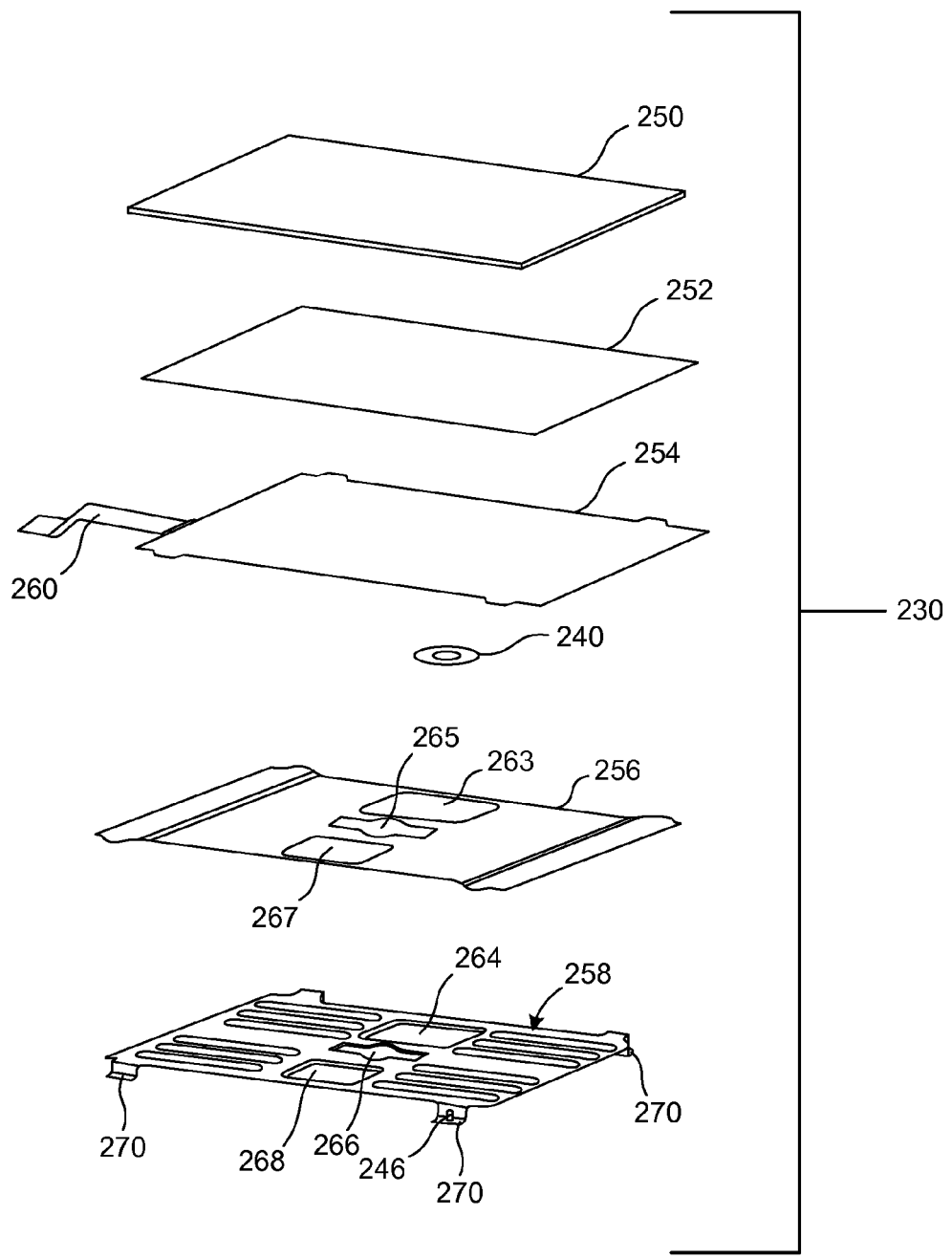
FIG. 7 is an exploded view of the trackpad assembly of FIG. 6.
Figure 8:
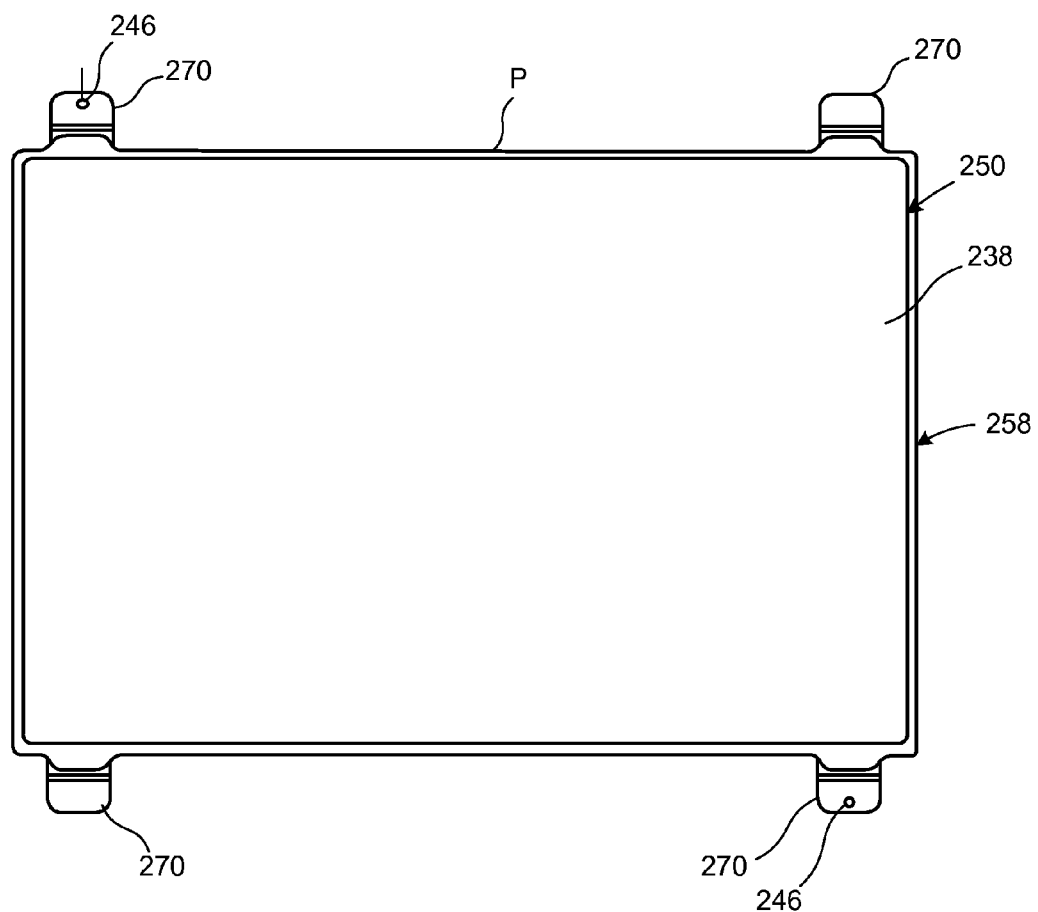
FIG. 8 is a top view of a portion of the trackpad assembly of FIG. 6.

FIG. 6 is a perspective view of the trackpad assembly 234 and FIG. 7 is an exploded view of the trackpad assembly 234 (also referred to as "trackpad"). As shown in FIG. 7, the trackpad 234 includes a cover member 250, a first adhesive sheet 252, a sensor (e.g., a printed circuit board) 254, a dome switch 240, a second adhesive sheet 256 and a base member 258. The cover member 250 can be formed with, for example, an electrostatic glass material. The cover member 250 has a top surface 238, which is the top surface of the trackpad 234 and is configured to receive inputs (e.g., a touch or click) by a user. The sensor 254 can be activated, for example, when a user touches or applies a force on the top surface 238 of the cover member 250, and can communicate electronic signals within the computing device 100. The sensor 254 can be, for example, a flame-retardant class-4 (FR4) printed circuit board.

Figure 9A:
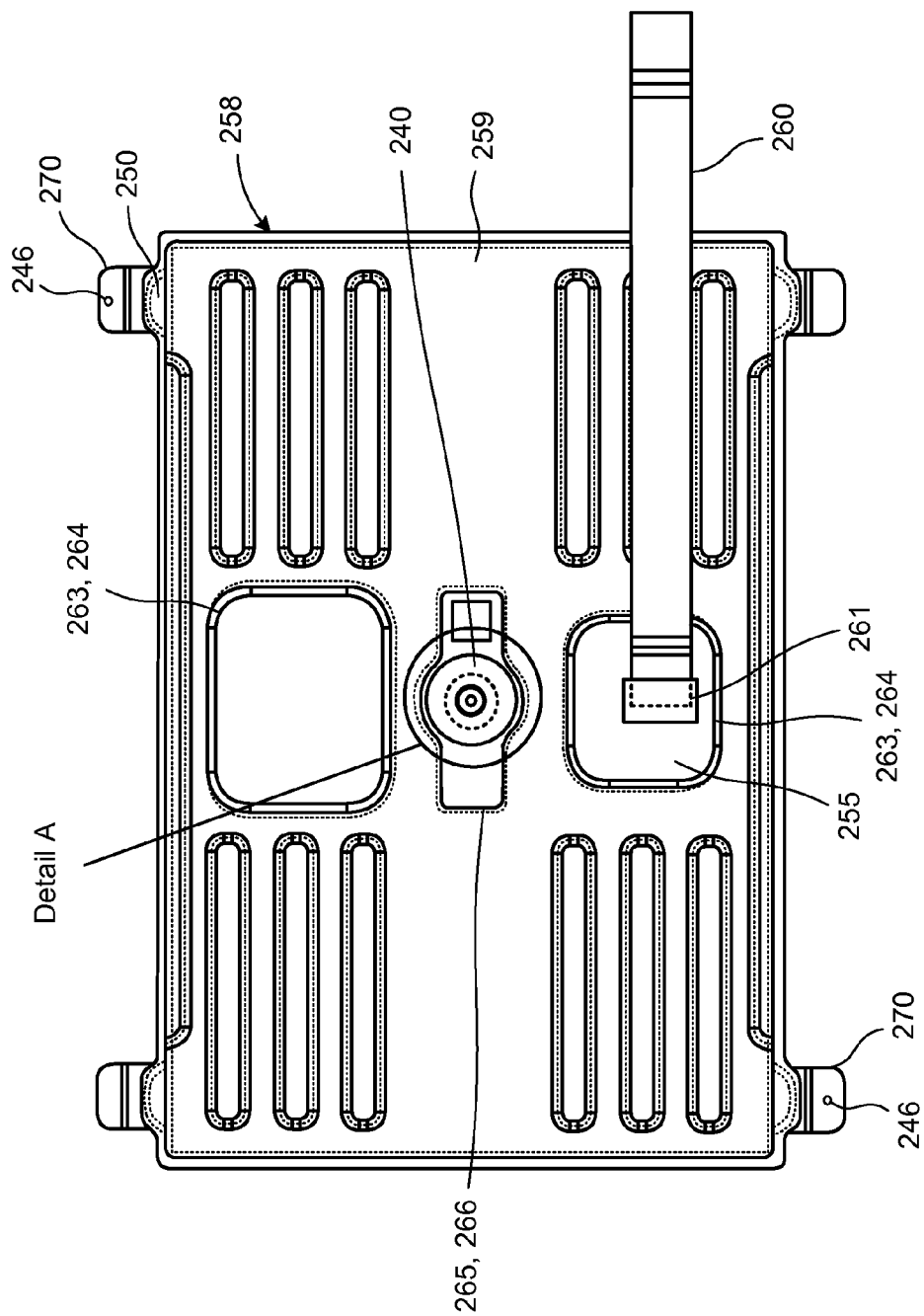
FIG. 9A is a bottom view of the trackpad assembly of FIG. 6.
Figure 9B:
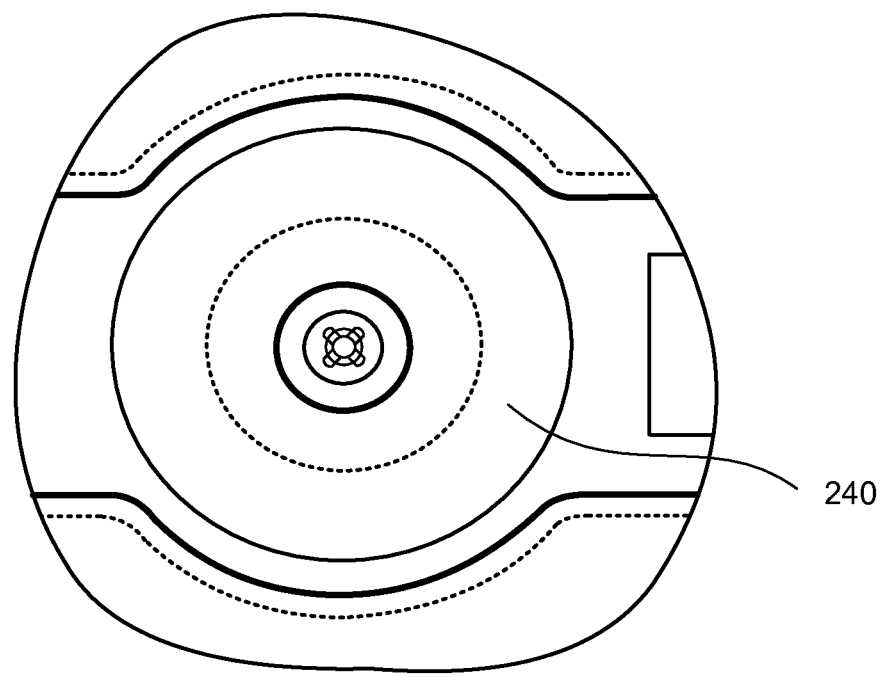
FIG. 9B is an enlarged view showing detail A in FIG. 9A.

The first adhesive sheet 252 can be adhered to a bottom surface (not shown) of the cover member 250 and used to adhesively couple the sensor 254 thereto. The first adhesive layer can be, for example, a pressure sensitive adhesive (PSA). A cable 260 can be coupled to the sensor 254. The cable 260 can be, for example, a flat flex cable (FFC) or a flexible printed circuit (FPC). For example, the cable 260 can be coupled to a connector 261 disposed on a bottom surface 255 of the sensor 254, as shown in FIG. 9A. The connector 261 can be, for example, a zero insertion force (ZIF) connector. An end of the cable 260 can be inserted into the connector 261 with contacts (not shown) of the cable 260 facing down, as shown in FIG. 9A.

The second adhesive sheet 256 can be adhered to a top surface 262 of the base member 258 such that the openings 263, 265, and 267 defined in the adhesive sheet 256 align with corresponding openings 264, 266 and 268 defined in the base member 258. As with the first adhesive sheet 252, the second adhesive sheet 256 can be, for example, a pressure sensitive adhesive (PSA). The second adhesive sheet 256 can be used to couple the base member 258 to the bottom surface 255 of the sensor 254. The dome switch 240 can also be adhesively coupled to the bottom surface 255 of the sensor 254 such that the dome switch 240 can extend through the opening 265 of the second adhesive sheet 256 and the opening 266 in the base member 258, as best shown in the bottom views of FIGS. 9A and 9B. Also shown in FIG. 9A, when the trackpad 234 is assembled, a portion of the cable 260 can extend through the openings 263 and 264.

The base member 258 includes four legs 270 that can be used to support and couple the trackpad 234 to the housing 232. Although four legs 270 are shown, it should be understood that a different number of legs can alternatively be used. In addition, in alternative implementations, the legs 270 can be disposed at different locations on the base member 258. The base member 258 also includes two alignment pins 246 disposed on or coupled to two of the legs 270. In this implementation, the alignment pins 246 are disposed on legs 270 on opposite corners of the base member 258. As described above and as described in more detail below, the alignment pins 246 can be used to align and slidably couple the trackpad 234 to the housing 232. Although two alignment pins 246 are shown, it should be understood that a different number of alignment pins 246 can alternatively be included. For example, in an alternative implementation, the base member 258 can include three legs 270 and each can include an alignment pin 246. The three legs 270 can be located along the perimeter of the base member 258 in a spaced relationship to each other such that the legs 270 can consistently support the base member 258 during actuation of the input device 230.

The dome switch 240 can be electrically coupled to the sensor 254 such that when the dome switch 240 is actuated, the dome switch 240 can communicate an electronic signal to the sensor 254. The dome switch 240 can include electronic components commonly used in such switches that can electrically communicate with the sensor 254. The dome switch 240 can include a flexible or compressible portion that can be flexed or compressed when actuated. For example, the dome switch 240 can be pressed against an actuation member 244 (described below) when a user applies an input force on the top surface 238 of the cover member 250 to initiate a click function.

Figure 5:
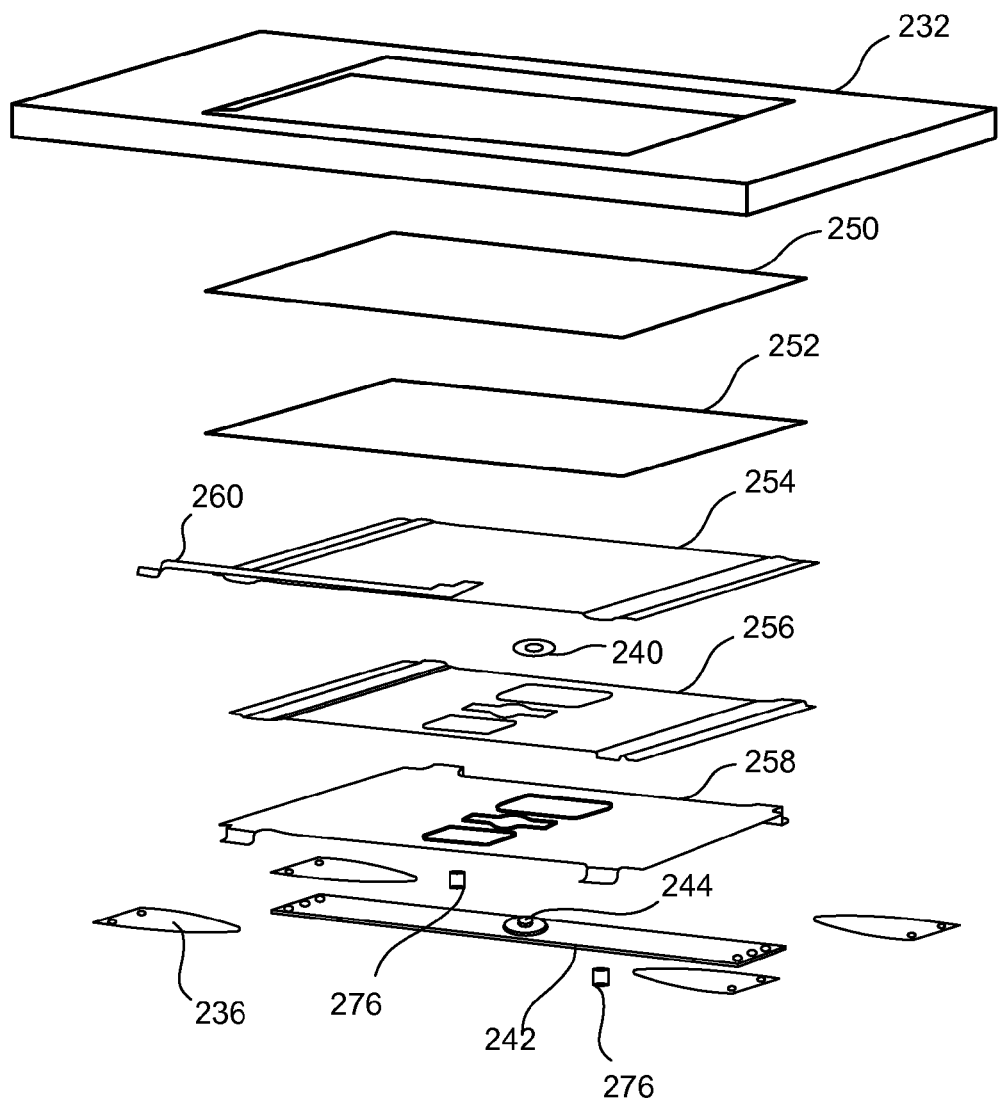
FIG. 5 is an exploded view of an input device according to another implementation.
Figure 10:
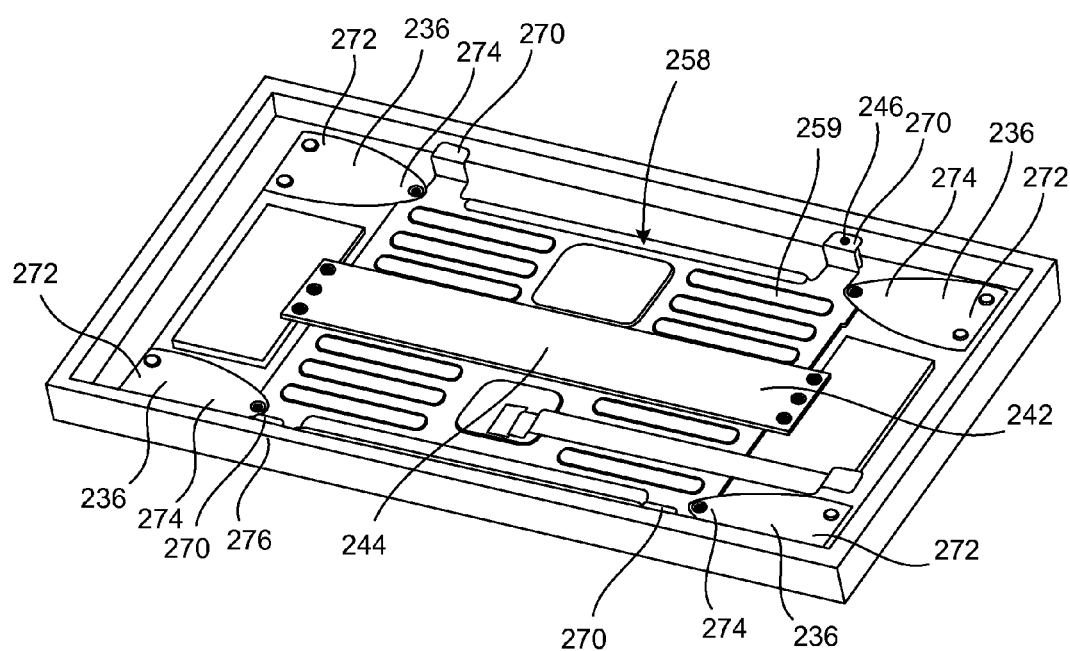
FIG. 10 is a bottom perspective view of the input device of FIG. 5.

As shown, for example, in FIGS. 5 and 10, the input device 230 also includes an arm member 242 that can be coupled to the housing 232 and the actuation member 244 can be coupled to the arm member 242. In this implementation, the actuation member 244 is a set screw. As described above for input device 130, during actuation of the input device 230 (e.g., a clicking function), the dome switch 240 can be compressed against the actuation member 244 to trigger an electronic signal within a computing device (e.g., computing device 100) (e.g., via the sensor 254). A height of the actuation member 244 can be adjusted by threadably turning the actuation member 244 (e.g., set screw) until a head of the actuation member 244 (e.g., a head of the set screw on which the dome switch 240 is compressed during actuation) is at a desired height or location relative to the housing 232 and/or the dome switch 240.

The input device 230 includes four support members 236 configured to support the trackpad 234 in a first position relative to the housing 232. The support members 236 can be, for example, spring members. The support members 236 can be, for example, flat springs. The support members 236 can be formed with for example, a stainless steel material such as SUS 301. Although four support members 236 are included in this implementation, it should be understood that a different number of support members can alternatively be used. For example, three support members or less can be used. In some implementations, more than four support members 236 can be used.

Figure 11A:
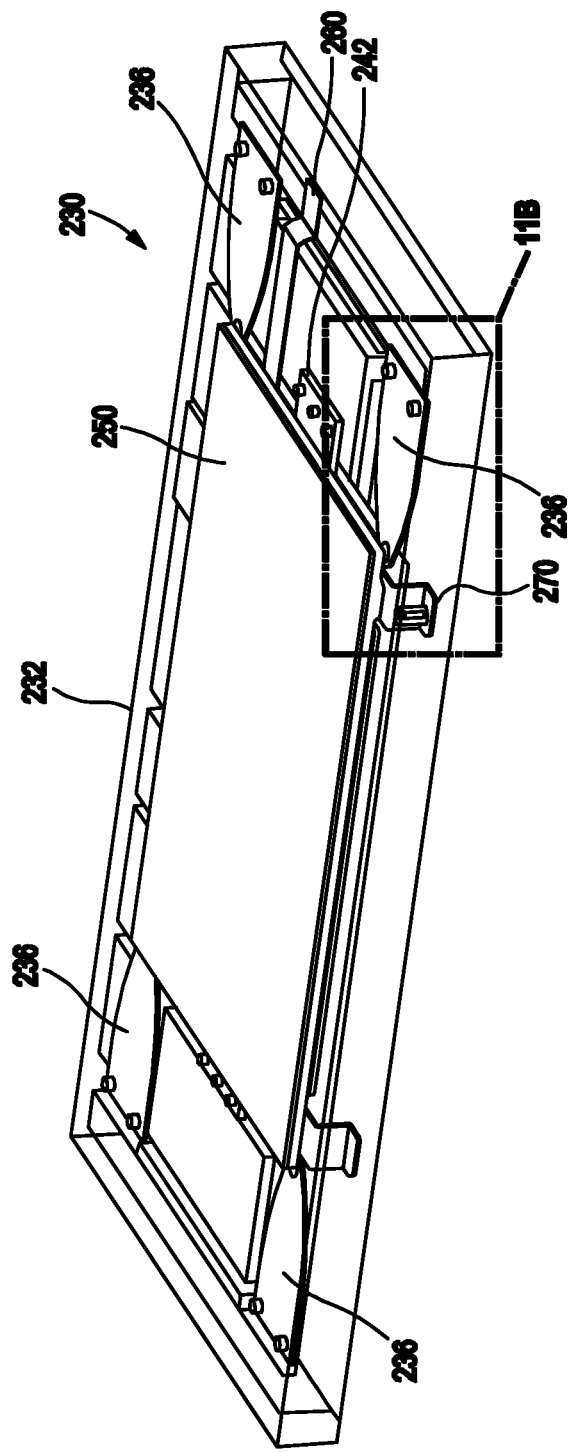
FIG. 11A is a top perspective view of the input device of FIG. 5.
Figure 11B:
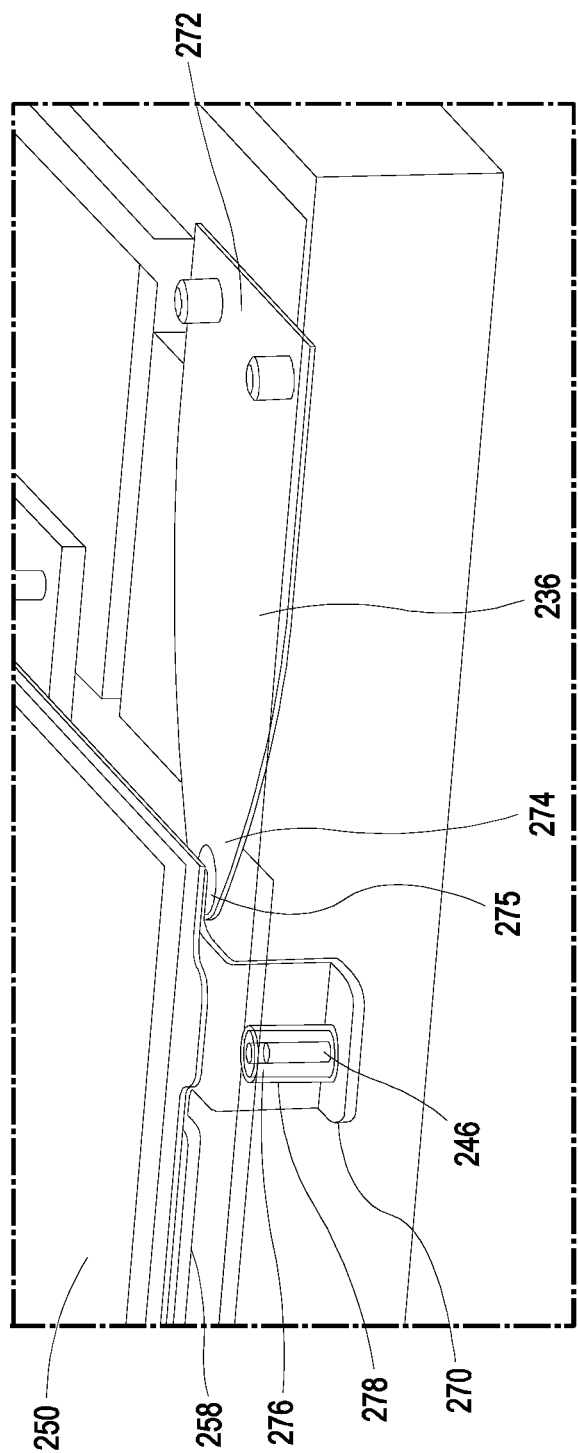
FIG. 11B is an enlarged view showing detail B in FIG. 11A.

As shown, for example, in FIGS. 10, 11A and 11B (which illustrate the assembled input device 230), the support members 236 include a first end portion 272 fixedly coupled to the housing 232 and a second end portion 274 that is free-floating and disposed beneath and contacting a bottom surface 259 of the base member 258 of the trackpad 234. As described above, the second end portion 274 is free-floating in that it is cantilevered from the first end portion 272. The second end portion 274 can also include a bump or raised portion 275 on which the base member 258 can rest. The first end portion 272 is disposed outside an outer perimeter portion P of the cover member 250 (see FIG. 8).

The support members 236 can have a first configuration in which the support members 236 bias and support the trackpad 234 in its first position and can be moved (e.g., bend or flex) to a second configuration when the trackpad 234 is moved to a second position relative to the housing 232. For example, when a user exerts an input force on the top surface 238 of the cover member 250 to initiate a clicking function, the trackpad 234 will be moved downward (e.g., in a vertical direction) to its second position and exert a force on the support members 236. In other words, the second end portion 274 of the support members 236 can bend or flex relative to the first end portion 272 of the support members 236 when a force exerted on the top surface 238 of the trackpad 234.

Figure 12:
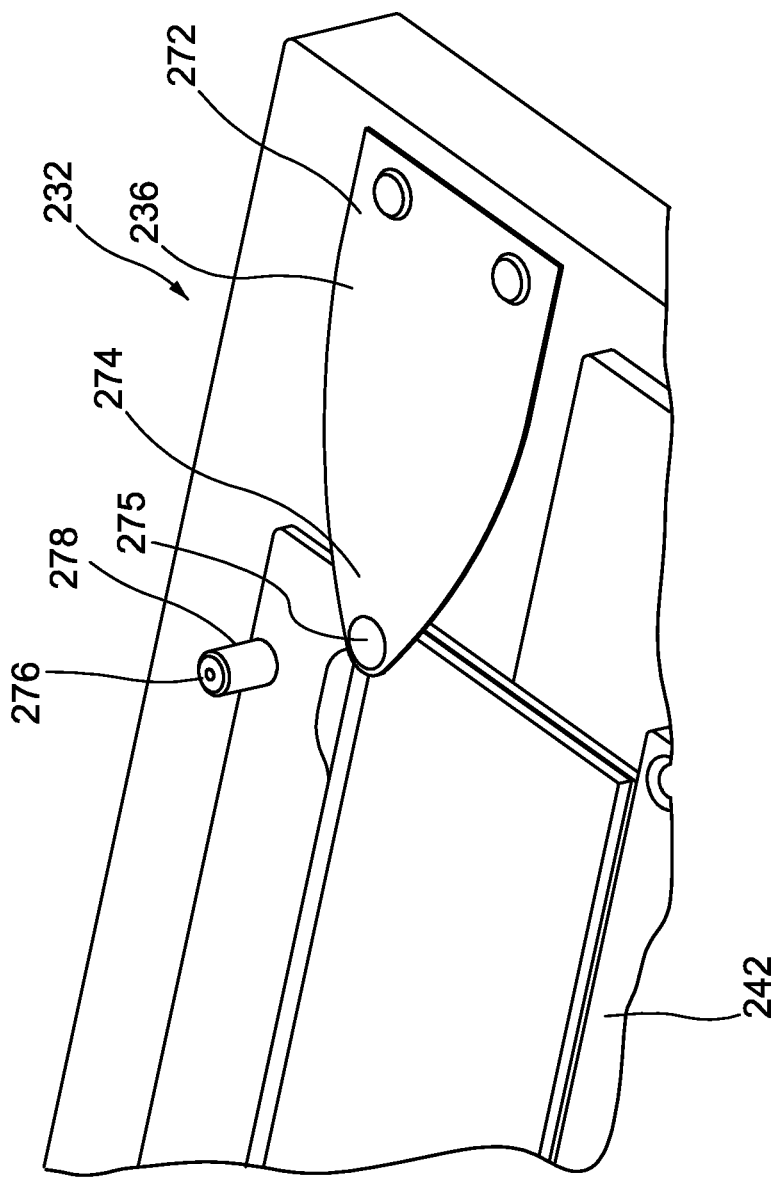
FIG. 12 is an enlarged bottom perspective view of a portion of the input device of FIG. 5, with the trackpad assembly removed.

The trackpad 234 can be slidably coupled to the housing 232 with the alignment pins 246 on the base member 258. As shown, for example, in FIG. 12, bushings 276 can be disposed within channels 278 defined in the housing 232 (FIG. 12 illustrates an enlarged portion of the input device 230 with the trackpad 234 removed for illustration purposes). As shown, for example, in FIGS. 11A and 11B (the enclosure 232, legs 270 and bushings 276 are shown transparent in FIGS. 11A and 11B for illustration purposes), the alignment pins 246 can be slidably received within the bushings 276. In alternative implementations, the alignment pins 246 may be slidably received within a mating channel defined in the housing 232 (e.g., without the bushings 276). The alignment pins 246 can provide a slidable coupling of the trackpad 234 to the housing 232 and can also help align the trackpad 234 to the housing 232 during assembly of the input device 230. The alignment pins 246 can also provide for consistent vertical movement of the trackpad 234 when it is actuated (e.g., when a user exerts a force on the top surface of the trackpad) as described in more detail below.

The slidable coupling of the trackpad 234 to the housing 232 together with the support members 236 and the alignment pins 246 allows the trackpad 234 to move from its first position to its second position upon actuation by a user (e.g., an input force exerted on the top surface 238) such that the top surface 238 of the cover member 250 is moved from a first plane to a second plane that is substantially parallel to the first plane. Said another way, the entire top surface 238 of the cover member 250 is disposed in a first plane when the trackpad 234 is in its first position and the entire top surface 238 of the cover member 250 is in a second plane substantially parallel to the first plane when the trackpad 234 is in its second position. The outer perimeter P (see FIG. 8) of the cover member 250 is moved substantially an equal distance when the trackpad 234 is moved from its first position to its second position. Thus, when a user exerts a force, for example, on a right side of the top surface 238 of the trackpad 234, the left side of the trackpad 234 will move the same or substantially the same distance as the right side. As described above, this can provide a user with a consistent tactile response when clicking on any location on the top surface 238 of the cover member 250 of the trackpad 234.

When the user exerts an input force on the top surface 238 of the cover member 250, the trackpad 234 will be moved from its first position to a second position, which will actuate the dome switch 240 and trigger an electronic signal within the computing device 100 as described above. Specifically, the dome switch 240 will move with the trackpad 234 such that it is compressed against the actuation member 244 (e.g., the set screw), which will trigger an electronic signal from the dome switch 240 to the sensor 256 and to the computing device 100.

Figure 13:
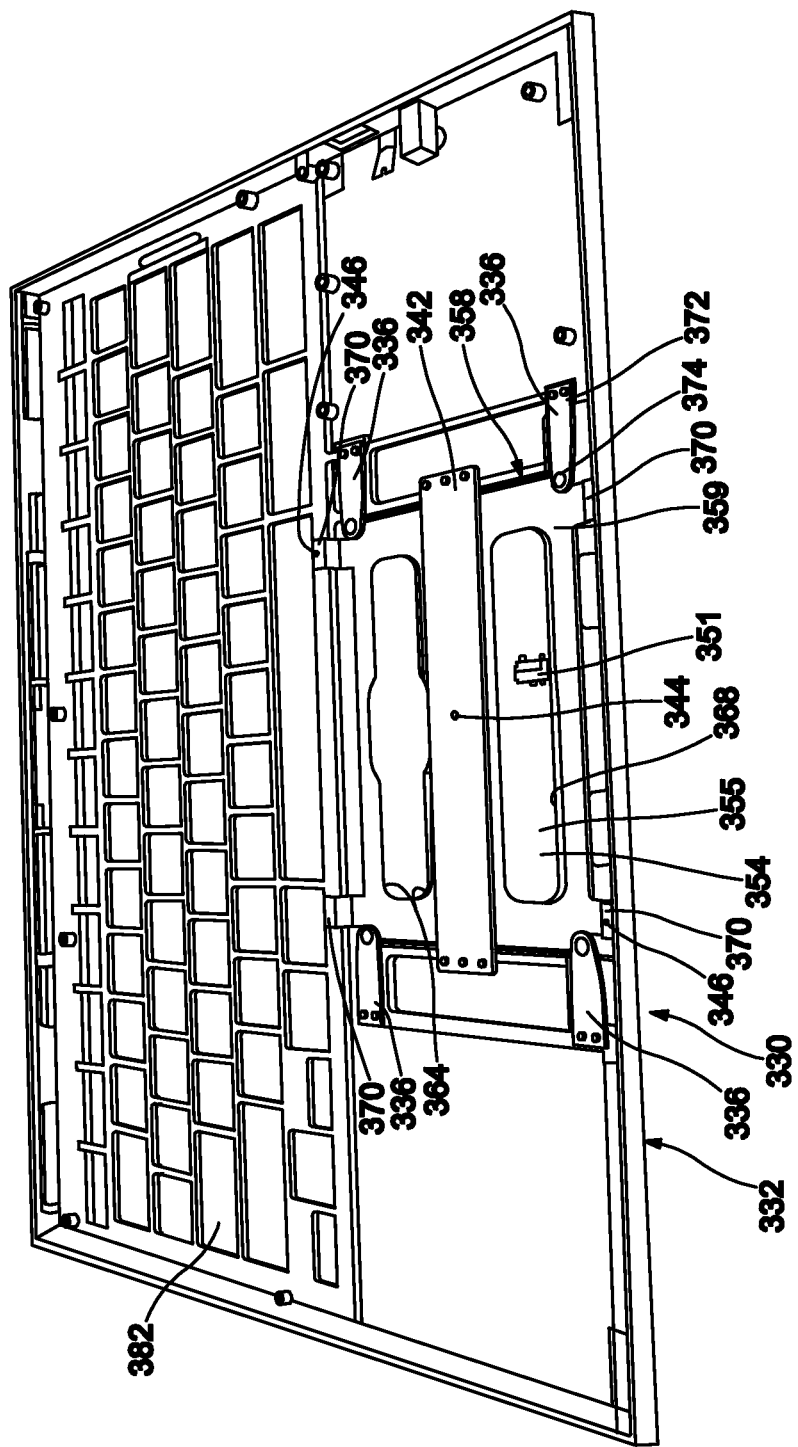
FIG. 13 is a bottom perspective view of an input device according to another implementation.

FIG. 13 is a bottom perspective view of an input device 330 according to another implementation. The input device 330 can be, for example, a touch (e.g., contact) sensitive device, such as, for example, an electrostatic device, a resistive device, a surface acoustic wave (SAW) device, a capacitive device, a pressure sensitive device, a surface capacitive device, a projected capacitive touch (PCT) device, and/or so forth as with above-described implementations.

Figure 14:
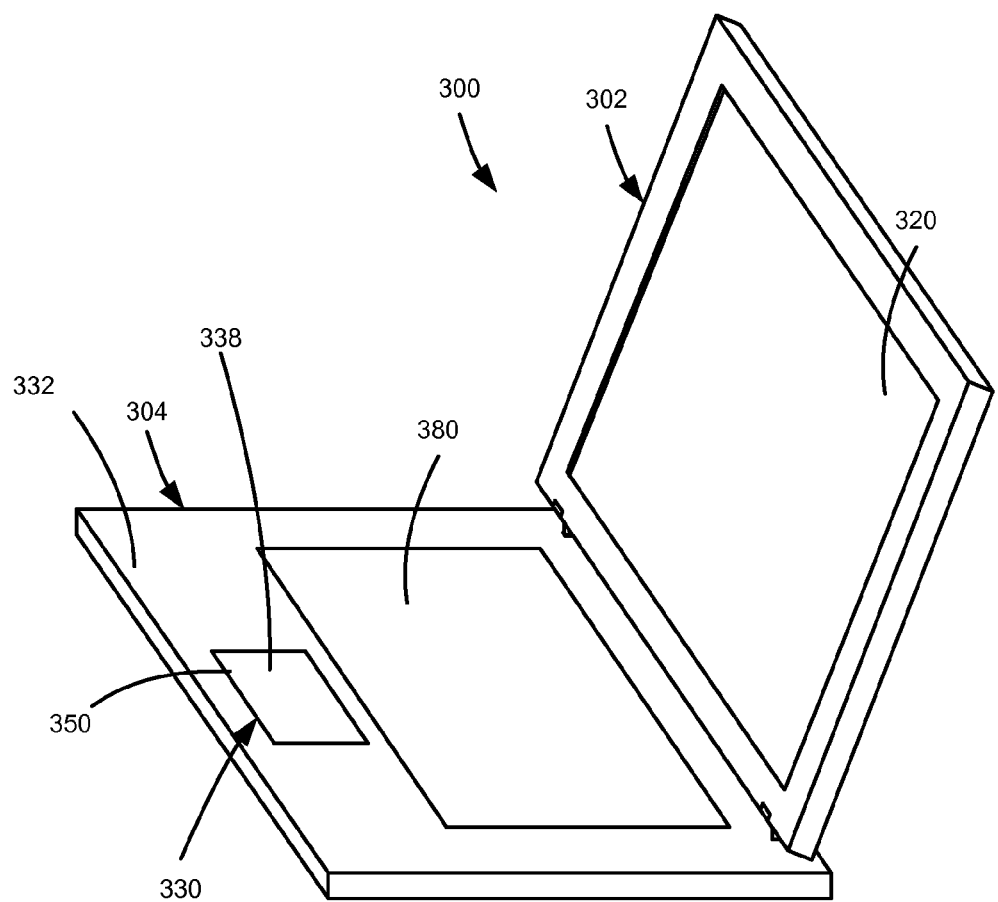
FIG. 14 is a perspective view of a computing device incorporating an input device according to an implementation.

The input device 330 includes a housing 332, a touchpad assembly 334 and support members 336. In this implementation, the housing 332 is an integral component of a computing device 300, shown in FIG. 14. The computing device 300 can be configured the same as or similar to the computing device 100 described above. The computing device 300 includes a base portion 304 and a display portion 302. The base portion 304 can include, among other components, the housing 332, the trackpad 334 and a keyboard portion 380. As shown in FIG. 13, the housing 332 can define multiple openings 382 for the keys of the keyboard portion 380. The display portion 302 of the computing device 300 includes a display 320 that can be, for example, a liquid crystal display (LCD), a light emitting diode (LED) display, or other type of display device.

The trackpad 334 can be configured the same as or similar to (e.g., include the same components) and can perform the same as or similar functions as the trackpad 134 and the trackpad 234 described above. For example, the trackpad 334 can include a cover member 350 (shown in FIG. 14), first and second adhesive sheets (not shown), a sensor (e.g., a printed circuit board) 354, a dome switch (not shown), and a base member 358. The cover member 350 can be formed with, for example, an electrostatic glass material. The cover member 350 can include a top surface 338 (shown in FIG. 14) configured to receive inputs (e.g., a touch or click) by a user. The sensor 354 can be activated when a user enters an input on the top surface 338 of the cover member 350 and can communicate electronic signals within the computing device 300. The sensor 354 can be, for example, a flame-retardant class-4 (FR4) printed circuit board.

The first and second adhesive sheets can each be, for example, a pressure sensitive adhesive (PSA). The first adhesive sheet can be adhered to a bottom surface (not shown) of the cover member 350 and used to adhesively couple the sensor 354 thereto. A cable (not shown) can be coupled to a connector 361 (e.g., a ZIF connector) disposed on a bottom surface 355 of the sensor 354. The cable can be, for example, a flat flex cable (FFC) or a flexible printed circuit (FPC).

The second adhesive sheet can be adhered to a top surface (not shown) of the base member 358 such that openings (not shown) defined in the second adhesive sheet align with corresponding openings 364 and 368 defined in the base member 358. The second adhesive sheet can be used to couple the base member 358 to the bottom surface 355 of the sensor 354. The dome switch can also be adhesively coupled to the bottom surface 355 of the sensor 354 such that the dome switch can extend through an opening (not shown) of the second adhesive sheet and an opening (not shown) defined in the base member 358.

The base member 358 includes four legs 370 that can be used to support and couple the trackpad 334 to the housing 332. Although four legs 370 are shown, it should be understood that a different number of legs can alternatively be used. The base member 358 also includes two alignment pins 346 disposed on or coupled to two of the legs 370. As with above-described implementations, the alignment pins 346 can be used to align and slidably couple the trackpad 334 to the housing 332.

The dome switch can be electrically coupled to the sensor 354 such that when the dome switch is actuated, the dome switch can communicate an electronic signal to the sensor 354. The dome switch can include electronic components commonly used in such switches that can electrically communicate with the sensor 354. The dome switch can include a flexible or compressible portion that can be flexed or compressed when actuated. For example, the dome switch can be pressed against an actuation member (not shown) when a user applies an input force on the top surface of the cover member 350 to initiate a click function.

The input device 330 also includes an arm member 342 that can be coupled to the housing 332 and the actuation member (e.g., a set screw) can be coupled to the arm member 342. As described above for input devices 130 and 230, during actuation of the input device 330 (e.g., a clicking function), the dome switch can be compressed against the actuation member to trigger an electronic signal within the computing device 300 via the sensor 354.

The four support members 336 are each configured to support the trackpad 334 in a first position relative to the housing 332. The support members 336 can be, for example, spring members. Although four support members 336 are included in this implementation, it should be understood that a different number of support members can alternatively be used.

The support members 336 include a first end portion 372 fixedly coupled to the housing 332 with, for example screws, or other mechanical fasteners, and a second end portion 374 that is free-floating and disposed beneath and contacting a bottom surface 359 of the base member 358.

The support members 336 can have a first configuration in which the support members 336 bias and support the trackpad 334 in a first position relative to the housing 332 and can be moved (e.g., bend or flex) to a second configuration when the trackpad 334 is moved to a second position relative to the housing 332. For example, when a user exerts an input force on the top surface 338 of the cover member 350 to initiate a clicking function, the trackpad 334 will be moved downward (e.g., in a vertical direction) to its second position and exert a force on the support members 336. In other words, the second end portion 374 of the support members 336 can bend or flex relative to the first end portion 372 of the support members 336 when a force is exerted on the top surface 338 of the cover member 350.

The trackpad 334 can be slidably coupled to the housing 332 with the alignment pins 346 on the base member 358 as described for input device 130 and input device 230. The alignment pins 346 can be slidably received within bushings (not shown) coupled to the housing 332 or can be slidably received within openings or channels (not shown) defined in the housing 332.

The slidable coupling of the trackpad 334 to the housing 332 together with the support members 336 allows the trackpad 334 to move from its first position to its second position such that the top surface 338 of the cover member 350 is moved from a first plane to a second plane that is substantially parallel to the first plane. As with above-described implementations, an outer perimeter of the support member 350 is moved a substantially equal distance (e.g., in a vertical direction) when the trackpad 334 is moved from its first position to its second position. Thus, a user can actuate a clicking function by exerting an input force at any location on the top surface 338 of the cover member 350 of the trackpad 334.

The components of the input devices (e.g., 130, 230, and 330) described herein can be formed with a variety of different materials such as plastic, metallic, glass, ceramic, etc. used for such components. For example, the cover member (e.g., 250), base member (e.g., 258), support members (e.g., 136, 236, 342), the switch (e.g., 140, 240), and the arm member (e.g., 242), can each be formed, at least in part, with an insulating material and/or conductive material such as a stainless steel material, for example, SUS301 or SUS304. The housing (e.g., 132, 232, 332) can be formed with, for example, various materials, such as, an aluminum alloy (e.g., Al5052).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computing device including an input device comprising:
   a housing including:
      a bottom wall disposed in a first plane;
      a first end disposed perpendicular to the bottom wall; and
      a second end disposed perpendicular to the bottom wall and opposite to the first end; and
   a trackpad including:
      an arm member coupled to the housing at the first end and the second end, the arm member being disposed above the bottom wall of the housing and in a second plane parallel to the first plane;
      a cover member having a top surface configured to receive an input force, the cover member being disposed above the arm member and in a third plane parallel to the second plane; and
      an actuation member coupled to the arm member, the actuation member being disposed between the arm member and the cover member.

2. The computing device of claim 1, wherein the trackpad further includes a switch coupled to the cover member, the switch configured to trigger an electrical signal within the computing device when an input force exerted on the top surface of the cover member causes the switch to make contact with the actuation member.

3. The computing device of claim 1, wherein the trackpad further includes:

a base member disposed between the arm member and the cover member, the base member being disposed below the cover member, above the arm member, and in a fourth plane parallel to the second plane and the third plane.

4. The computing device of claim 3,
wherein the base member includes a bottom surface; and
wherein the trackpad further includes a first support member including a first end portion and a second end portion opposite the first end portion, the first end portion of the first support member coupled to the first end of the housing and the second end portion of the first support member in contact with the bottom surface of the base member.

5. The computing device of claim 4,
wherein the trackpad further includes a second support member including a first end portion and a second end portion opposite the first end portion, the first end portion of the second support member coupled to the second end of the housing and the second end portion of the second support member in contact with the bottom surface of the base member.

6. The computing device of claim 5,
wherein the first support member is a first spring member; and
wherein the second support member is a second spring member.

7. The computing device of claim 6,
wherein the second end portion of the first support member is cantilevered from the first end portion of the first support member; and
wherein the second end portion of the second support member is cantilevered from the first end portion of the second support member.

8. The computing device of claim 3,
wherein the base member further includes at least two legs, each leg including an alignment pin;
wherein the housing further includes at least two channels, each channel including a bushing disposed within the channel; and
wherein each alignment pin is slidably received within a respective bushing, coupling the trackpad to the housing.

9. The computing device of claim 8, wherein the at least two legs each extend beyond an outer perimeter of the base member.

10. A trackpad comprising:
a cover member including a top surface and having a cover member outer perimeter;
an arm member parallel to and disposed below the cover member;
an actuation member coupled to the arm member, the actuation member being disposed between the arm member and the cover member;
a base member parallel to the arm member and the cover member, and disposed between the cover member and the arm member, the base member including:
 a base member outer perimeter greater than the cover member outer perimeter; and
 at least two legs located along the base member outer perimeter, the at least two legs extending beyond the base member outer perimeter and beyond the cover member outer perimeter; and
a switch disposed between the cover member and the base member, the actuation member being configured to make contact with the switch.

11. The trackpad of claim 10, wherein the switch is configured to trigger an electrical signal within a computing device when an input force exerted on the top surface of the cover member causes the actuation member to make contact with the switch.

12. The trackpad of claim 11, wherein causing the actuation member to make contact with the switch includes pressing the switch against the actuation member.

13. The trackpad of claim 10,
wherein the base member further includes a bottom surface; and
wherein the trackpad further includes a first support member including a first end portion and a second end portion opposite the first end portion, the first end portion of the first support member coupled to a first side of a housing and the second end portion of the first support member in contact with the bottom surface of the base member.

14. The trackpad of claim 13,
wherein the trackpad further includes a second support member including a first end portion and a second end portion opposite the first end portion, the first end portion of the second support member coupled to a second side of the housing opposite to the first side of the housing, and the second end portion of the second support member in contact with the bottom surface of the base member.

15. The trackpad of claim 10,
wherein each leg includes an alignment pin; and
wherein each alignment pin is configured to be slidably received within a corresponding channel included in a housing.

16. An input device comprising:
a housing including:
 a bottom wall disposed in a first plane;
 a first side disposed perpendicular to the bottom wall; and
 a second side disposed perpendicular to the bottom wall and opposite to the first side; and
a trackpad including:
an arm member coupled to the housing at the first side and the second side, the arm member being disposed above the bottom wall of the housing and in a second plane parallel to the first plane;
a cover member disposed above the arm member and in a third plane parallel to the second plane, the cover member including:
 a top surface; and
 a cover member outer perimeter;
an actuation member coupled to the arm member, the actuation member being disposed between the arm member and the cover member;
a base member disposed between the cover member and the arm member and in a fourth plane parallel to the second plane and the third plane, the base member including a base member outer perimeter greater than the cover member outer perimeter; and
a switch disposed between the cover member and the base member, the switch configured to trigger an electrical signal within a computing device when an input force exerted on the top surface of the cover member causes the switch to make contact with the actuation member.

17. The input device of claim 16, wherein the base member further includes at least two legs located along the base member outer perimeter, the at least two legs extending beyond the base member outer perimeter and beyond the cover member outer perimeter.

18. The input device of claim 17,
wherein each of the at least two legs include an alignment pin;
wherein the housing further includes at least two channels, each channel including a bushing disposed within the channel; and
wherein each alignment pin is slidably received within a respective bushing, coupling the trackpad to the housing.

19. The input device of claim 16,
wherein the base member further includes a bottom surface; and
wherein the trackpad further includes a first support member including a first end portion and a second end portion opposite the first end portion, the first end portion of the first support member coupled to the first side of the housing and the second end portion of the first support member in contact with the bottom surface of the base member.

20. The input device of claim 19,
wherein the trackpad further includes a second support member including a first end portion and a second end portion opposite the first end portion, the first end portion of the second support member coupled to the second side of the housing and the second end portion of the second support member in contact with the bottom surface of the base member.

* * * * *